United States Patent [19]

Machida et al.

[11] Patent Number: 5,543,949
[45] Date of Patent: Aug. 6, 1996

[54] LCD POLYMER ORIENTING FILM WITH A DIPOLE MOMENT GREATER THAN 20 DEBYE AND IS BOUND TO THE SUBSTRATE SURFACE THROUGH A SURFACE TREATING AGENT

[75] Inventors: Shigeru Machida, Tokyo; Taeko I. Urano, Kawasaki; Kenji Sano, Tokyo; Yasushi Mori, Yokohama, all of Japan

[73] Assignee: Kabushiki Kaisha Toshiba, Kawasaki, Japan

[21] Appl. No.: 291,456

[22] Filed: Aug. 18, 1993

[30] Foreign Application Priority Data

Aug. 18, 1993 [JP] Japan .................... 5-203972

[51] Int. Cl.⁶ ..................... G02F 1/1337; G02F 1/141
[52] U.S. Cl. ................. 359/75; 359/77; 359/78
[58] Field of Search ................. 359/75, 77, 78

[56] References Cited

U.S. PATENT DOCUMENTS

| | | | |
|---|---|---|---|
| 4,842,375 | 6/1989 | Seeboth et al. | 359/75 |
| 5,101,011 | 3/1992 | Mikami et al. | 528/328 |
| 5,133,895 | 7/1992 | Ogawa et al. | 359/76 |
| 5,186,986 | 2/1993 | Ogawa | 359/75 |
| 5,256,456 | 10/1993 | Ogawa | 359/75 |
| 5,419,931 | 5/1995 | Asaokao et al. | 359/75 |
| 5,422,748 | 6/1995 | Yamashita et al. | 359/75 |

FOREIGN PATENT DOCUMENTS

| | | |
|---|---|---|
| 273326 | 3/1990 | Japan . |
| 2-131223 | 5/1990 | Japan . |
| 3-103828 | 4/1991 | Japan . |
| 4288589 | 10/1992 | Japan . |
| 4356020 | 12/1992 | Japan . |

*Primary Examiner*—Anita Pellman Gross
*Assistant Examiner*—Toan Ton
*Attorney, Agent, or Firm*—Cushman Darby & Cushman, L.L.P.

[57] ABSTRACT

A liquid crystal device including two substrates each having a liquid crystal orienting film formed on each opposing surface, and a liquid crystal sealed between these substrates, wherein a liquid crystal orienting film formed on the surface of at least one of the two substrates is constituted by a polyamino acid film having a rigid structure and a dipole moment that is bound to the surface of the substrate through a layer of surface treating agent.

8 Claims, 8 Drawing Sheets

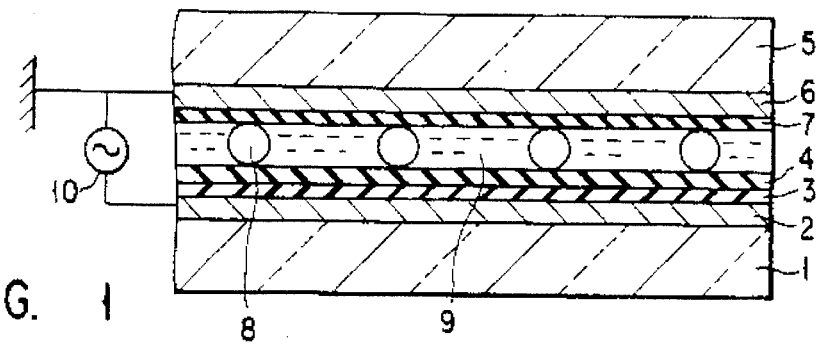
F I G. 1
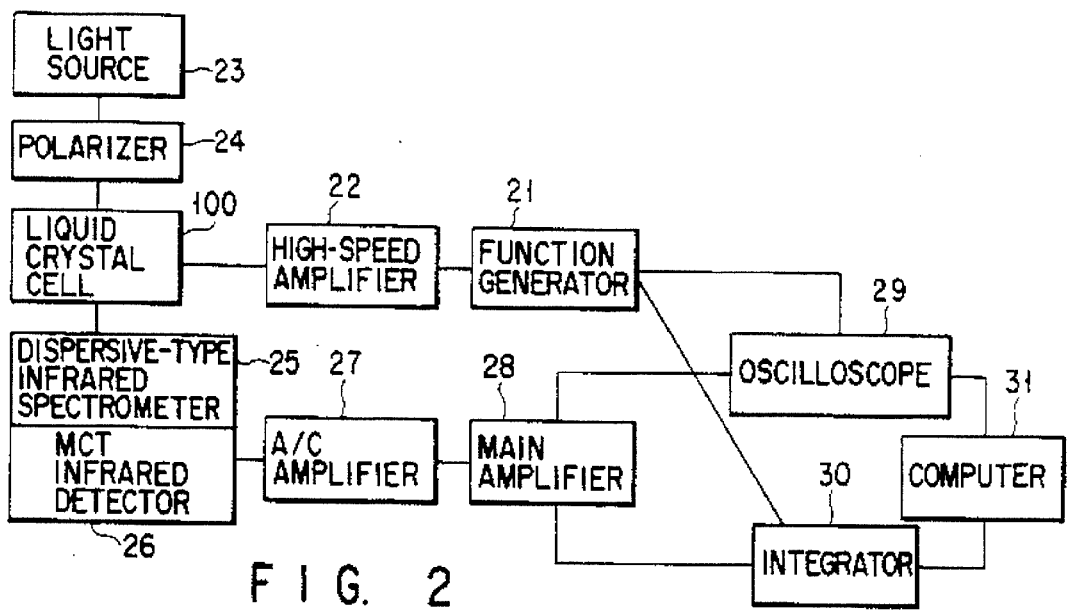
F I G. 2
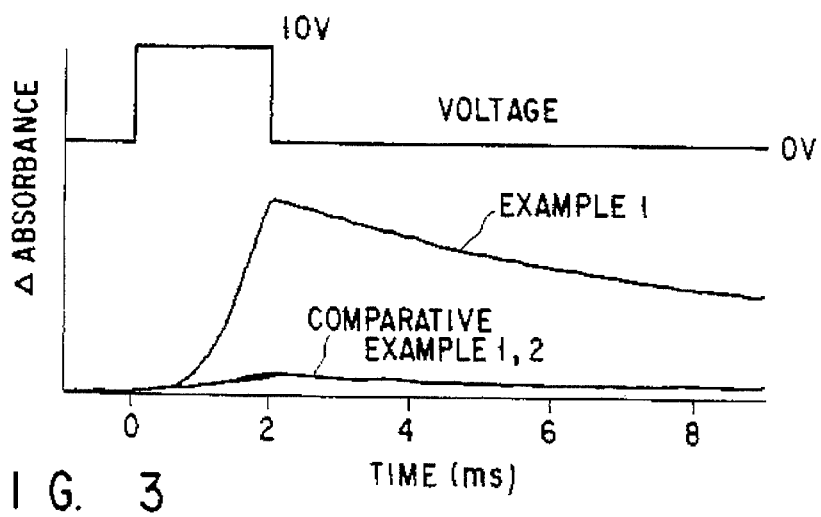
F I G. 3

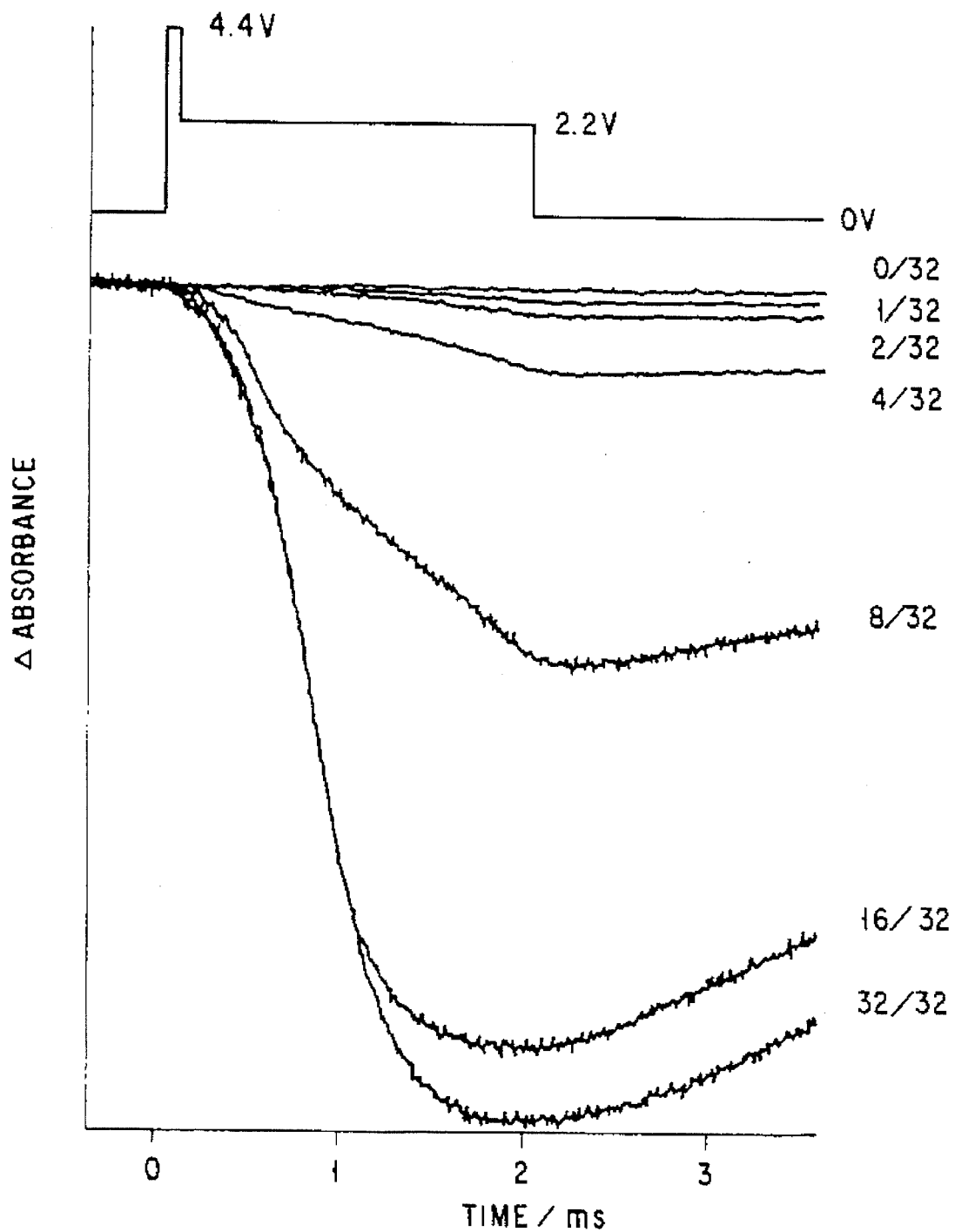
F I G. 8

LCD POLYMER ORIENTING FILM WITH A DIPOLE MOMENT GREATER THAN 20 DEBYE AND IS BOUND TO THE SUBSTRATE SURFACE THROUGH A SURFACE TREATING AGENT

BACKGROUND OF THE INVENTION

1. Field of the Invention

The present invention relates to a liquid crystal device and a method of driving the same.

2. Description of the Related Art

Conventionally, a liquid crystal display is popularly used, as the most promising compact flat panel display, for the display of a calculator or a watch, a display for an automobile, a display for a personal computer, or a moving picture display such as a compact liquid crystal television. In recent years, a liquid crystal device has been applied to not only display devices but also a shutter array, a light bulb, a switching device for optical information processing, and an optical memory. Therefore, the application range of the liquid crystal device has been widened. As described above, in order to generally use a liquid crystal device in the above application fields, a higher voltage response must be achieved.

In order to increase the voltage response of a liquid crystal, the following methods are generally used:

1) The viscosity of a liquid crystal is decreased by adding an agent to the liquid crystal, thereby increasing the movement of liquid crystal molecules.

2) A pre-tilt angle is increased by changing the structure of a liquid crystal orienting film.

3) A liquid crystal other than a nematic liquid crystal, e.g., a ferroelectric liquid crystal having a high sensitivity to an electric field is used.

4) The Waveform of a driving voltage to be applied is controlled.

At present, however, a response of a liquid crystal with respect to the applied voltage is hard to reach a response required in the above application fields. In addition, since a ferroelectric liquid crystal is not easily synthesized, only a few ferroelectric liquid crystal devices manufactured as samples are reported.

SUMMARY OF THE INVENTION

The object of the present invention is to provide a liquid crystal device capable of realizing a high response with respect to a voltage and a method of driving the liquid crystal device.

A liquid crystal device according to the present invention comprises two substrates each having a liquid crystal orienting film on each opposing surface and a liquid crystal sealed between the substrates, wherein the liquid crystal orienting film formed on a surface of at least one of the two substrates is constituted by a polymer film having a rigid structure and a dipole moment that is bound to the surface of the substrate through a layer of a surface treating agent.

In a method of driving a liquid crystal device according to the present invention by applying a voltage across two substrates, before an effective driving voltage is applied, an initial voltage higher than the effective driving voltage is applied.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a sectional view showing a liquid crystal cell formed according to Example 1 of the present invention;

FIG. 2 is a block diagram showing the circuit arrangement of a measuring apparatus used for observing the response of liquid crystal molecules;

FIG. 3 is a graph showing the response curves of the liquid crystal cell according to the present invention and conventional liquid crystal cells with respect to the application and stop of a voltage;

FIG. 8 is a graph showing the response curves of the liquid crystal cell according to Example 3 of the present invention when a method of applying a positive voltage is changed;

DETAILED DESCRIPTION OF THE PREFERRED EMBODIMENTS

Figure 4:
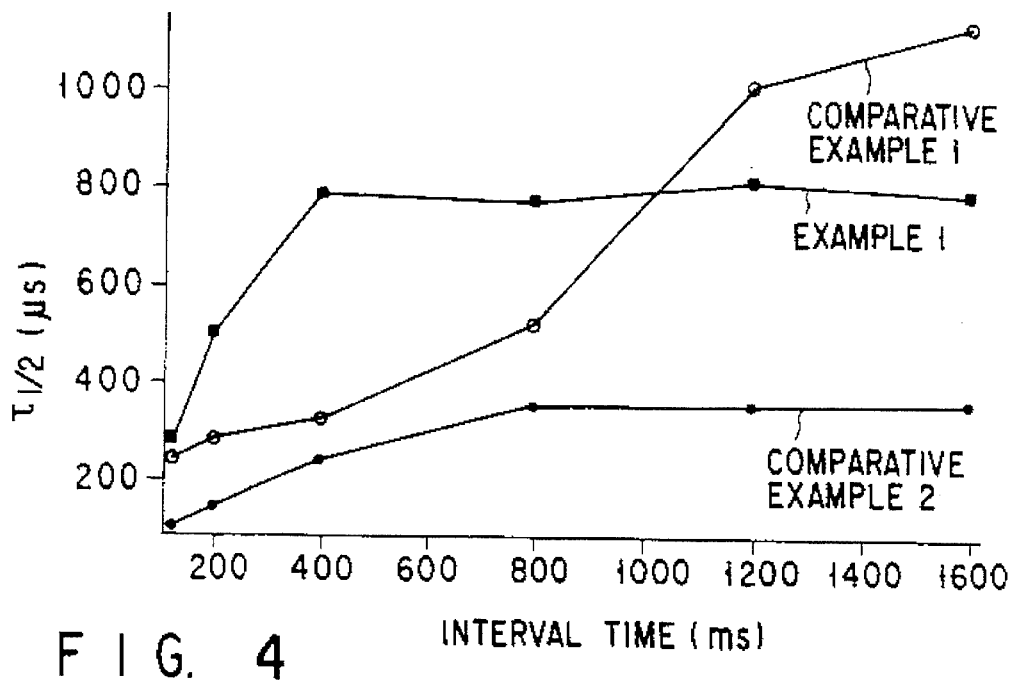
FIG. 4 is a graph showing the response curves of the liquid crystal cell according to the present invention and conventional liquid crystal cells with respect to the interval time of an application voltage.

In the present invention, two substrates that have electrodes on their surfaces (across which a voltage can be applied) may be used as substrates without limiting their materials. A substrate having functional groups uniformly present at a high density on a surface thereof is properly used. Of these functional groups, —OH groups are most generally used. The —OH groups can be easily generated by acid-treating the surface of a substrate consisting of glass, sapphire, silicon, germanium, a metal, or an ITO (Indium Tin Oxide).

In the present invention, the surface of such a substrate is chemically treated with a surface treating agent to form a layer of surface treating agent, thereby increasing the functional group density on the substrate Surface. As the surface treating agent, silicon tetrachloride, a silane coupling agent, a titanium coupling agent, or the like is used.

The above treatment is performed as follows. A surface of substrate is acid treated to generate functional groups such as —OH groups, and then treated with a silane coupling agent or the like. A silane coupling agent having primary amino groups, hydroxyl groups, isocyanate groups, isothiocyanate groups, or carboxyl groups is preferably used. In addition, a titanium coupling agent having similar functional groups may also be used.

In the present invention, a polymer film having a rigid structure and a dipole moment is bound to the above layer of surface treating agent so as to form a liquid crystal orienting film on the substrate surface. A polymer having functional groups which react with the functional groups of the layer of the surface treating agent is used. The functional groups of the polymer may be located either at the main chain or at side chains. Rigid portions may also be located either at the main chain or at side chains. The dipole moment value of the polymer is desirably set to be 20 debye or more because an orienting force acting on liquid crystal molecules must be sufficiently removed by moving the polymer in the liquid crystal orienting film when a voltage is applied. In the obtained polymer film, a rigid, rod-like polymer having a large dipole moment is aligned such that the molecular chains of the polymer molecules are not intertwined.

An example of such a polymer—a polymer Which has a π-conjugated system constituted by heterocycles and a structure having an electron-withdrawing portion and an electron-donating portion—is an oxiazine dye. Alternative examples of the above polymer include polyamides, polyamic acids, polyesters, and polyamino acids each having functional groups. Known examples of polyamino acids that form a α-helix structure include polyalanine, polyaspartic acid, polyaspartate, a polyglutamic acid, polyglutamate, polyleucine, polylysine, polyphenylalanine, and polytyrosine. These polymers are also known as liquid crystal polymers or lyotropic liquid crystal polymers.

Polymers having a dipole moment of 350 to 4,000 debye are preferable. In this case, a dipole moment value falling within this range corresponds to a molecular weight of 20,000 to 250,000 in the above polyamino acid. For example, the dipole moment of poly(γ-benzyl-L-glutamate), PBLG, increases in proportion to the molecular weight, and it exceeds 2,000 debye for a molecular weight of 150,000. However, when the dipole moment of the polymer becomes excessively large, electrostatic breakdown may occur in the liquid crystal orienting film. For this reason, as described above, the dipole moment of the polymer is preferably set to 4,000 debye or less.

When the polymer film consists of a polyamino acid, the polyamino acid may consist of a mixture of an L-form and a D-form. The ratio of the L-form to the D-form is preferably set within a range of 1:3 to 3:1 as a molar ratio of repeating units. When the polyamino acid consisting of a mixture of an L-form and a D-form is used, an influence of the u-helix structure on liquid crystal alignment can be canceled. For this reason, a contrast ratio can be increased.

In the present invention, the dipole moments of polymer films having a rigid structure and a dipole moment each of which constitutes a liquid crystal orienting film formed on the surface of each of two substrates through a layer of surface treating agent preferably have components of the same direction with respect to the direction perpendicular to these substrates. In the above arrangement, the voltage response of the liquid crystal can be increased.

In addition, in the present invention, polymer films having a rigid structure and a dipole moment each of which constitutes a liquid crystal orienting film formed on the surface of each of two substrates through a layer of a surface treating agent may have uniaxial alignment. As a practical method of causing a polymer film to have uniaxial alignment, a method of applying a magnetic or electric field in formation of the polymer film and a method of rubbing the polymer film after formation of the polymer film are known. In the present invention, if the uniaxial alignment is introduced to the polymer film serving as the liquid crystal orienting film, the liquid crystal alignment is improved when no voltage is applied.

A liquid crystal orienting film used in the liquid crystal device of the present invention that is constituted by a polymer film having a rigid structure and a dipole moment has a liquid crystal orienting force stronger than that of a normal rubbed polyimide film when no voltage is applied. In general, the stronger the liquid crystal orienting force of a liquid crystal orienting film, the stronger an orienting force acting on the liquid crystal molecules becomes. For this reason, it may be supposed that the liquid crystal molecules are hard to move near the interface with the liquid crystal orienting film, so that the response of the liquid crystal device will be delayed, or a driving voltage will be increased. However, when a voltage is applied to a liquid crystal orienting film used in the liquid crystal device of the present invention, polymer molecules in the liquid crystal orienting film are moved due to a large dielectric anisotropy, and the alignment of the polymer molecules is disturbed. As a result, the orienting force acting on the liquid crystal molecules is lost. For this reason, the homeotropic alignment of liquid crystal molecules can be achieved at a higher speed and at a lower voltage When the above liquid crystal orienting film is used than when a normal rubbed polyimide film is used. When the liquid crystal orienting film is used, the orienting force acting on liquid crystal molecules is not lost even when a voltage is applied.

In the liquid crystal orienting film described above, the molecular chains of adjacent polymer molecules are not intertwined. For this reason, when voltage application is stopped, the alignment of the polymer molecules is rapidly restored due to a hysteresis effect of the alignment. Therefore, the strong liquid crystal orienting force of the polymer film is restored, and the alignment of the liquid crystal molecules to which no voltage is applied can be reproduced at a high speed.

When the liquid crystal device having the above arrangement is to be driven, if an initial voltage higher than an effective driving voltage before the effective driving voltage is applied, an orienting force acting on the liquid crystal molecules by the liquid crystal orienting film is lost during application of the high initial voltage. For this reason, a higher response can be realized.

In this case, the application time of the initial voltage is preferably set to be 40 µs or more. In this manner, when the initial voltage higher than the effective driving voltage is applied to the liquid crystal orienting film first, alignment of the liquid crystal orienting film itself is rapidly disturbed, and an orienting force acting on the liquid crystal of a bulk apart from the liquid crystal orienting film is also lost. For this reason, even when a lower effective driving voltage is used (lower than a constant driving voltage which is regularly used), the liquid crystal can be driven. In addition, as described above, since the application time of the high initial voltage applied is first satisfactorily set to be about 40 µs, the effective driving voltage can be set to be 0.8 or more times and less than a regular driving voltage to reduce power consumption.

A preferred method of driving the aforementioned liquid crystal device will be described below. When this liquid crystal device is to be driven, it is preferable to apply an initial voltage higher than the effective driving voltage before the effective driving voltage is applied. It is also preferable to apply a positive voltage to the substrate on which the polymer film has the dipole moment directed from a substrate side to the film surface. Similarly, it is preferable to apply a negative voltage to the substrate on which the polymer film has the dipole moment directed from a film surface side to the substrate.

In addition, in a method of applying an AC voltage to the liquid crystal device of the present invention, a voltage applied first is desirably changed in accordance with the direction of the dipole moment of a polymer film serving as a liquid crystal orienting film. More specifically, when the dipole moment is directed from the substrate side to the film surface, an AC voltage is desirably applied to the liquid crystal device such that the first pulse applied to the substrate having this polymer film formed thereon has a negative voltage. Likewise, when the dipole moment of the polymer film is directed from the film surface side to the substrate, an AC voltage is desirably applied to the liquid crystal device such that the first pulse applied to the substrate having the polymer film formed thereon has a positive voltage. For example, when PBLG is used as a polymer constituting the liquid crystal orienting film, the carboxyl group is bound to the substrate and the amino group is present on the film surface side. In this case, when a negative voltage is first applied to this substrate, the liquid crystal device can be driven at a higher speed.

EXAMPLES

Examples of the present invention will be described below with reference to the accompanying drawings.

Example 1

A liquid crystal cell according to this example shown in FIG. 1 is formed as follows. A glass substrate 1 (20 mm×5 mm) having an ITO electrode 2 formed on a surface thereof is prepared. This glass substrate 1 is washed with flowing distilled water for an hour, washed with methylene chloride by ultrasonic cleaning for 5 minutes, and then washed with a flon vapor. 1.25 g of N-(2-aminoethyl)-3-aminopropylmethyldimethoxysilane (silane coupling agent available from Toshiba Silicone, tradename: TSL-8345) serving as a surface treating agent are mixed with 25 cc of distilled water and 1 cc of an acetic acid. This mixture is stirred, thereby preparing a solution of Ph 4 for surface treatment. The glass substrate 1 is dipped into this solution, and kept in the solution at room temperature for 8 hours. The glass substrate 1 is washed with methylene chloride, distilled water, and acetone in this order and then dried. As a result, a layer of surface treating agent 3 terminated with amino groups is formed on the surface of the ITO electrode 2.

Subsequently, 3 g of poly(γ-benzyl-L-glutamate) (PBLG, available from Sigma, molecular weight: 116,000), a polymer having a rigid structure and a dipole moment of 1,000 debye or more, are dissolved in 50 cc of dry methylene chloride. 1.4 g of DCC (dicyclohexylcarbodiimide) are then added to the mixture which is reacted at 0° C. for 20 minutes. The glass substrate 1 is dipped into this solution, and the temperature of the solution is slowly raised to room temperature. In this state, the glass substrate 1 is reacted with the solution overnight. Upon completion of the reaction, the glass substrate 1 is washed With methylene chloride, acetone, distilled water, and acetone in this order to remove by-products and excessive PBLG from the glass substrate 1. This forms a liquid crystal orienting film 4 constituted by a PBLG monolayer film on the layer of the surface treatment agent 3.

The thickness of the PBLG monolayer film formed as described above is estimated to be about 75 nm assuming that all the molecules of the film are aligned perpendicularly to the substrate surface. The contact angle of water measured before the formation of the PBLG monolayer film is 22°, but that measured after the formation of the PBLG monolayer film is 51°. For this reason, it is found that the PBLG monolayer film is hydrophobic due to the PBLG skeleton. In addition, when an atomic ratio on the surface of the PBLG monolayer film is measured by an XPS method, the ratio of carbon to nitrogen is about 12:1. It is confirmed that the ratio coincides with that of the composition of PBLG.

As shown in FIG. 1, a substrate is obtained by the above method such that the liquid crystal orienting film 4 consisting of PBLG is bound to the surface of the ITO electrode 2 on the glass substrate 1 through the layer of the surface treating agent 3. This substrate is used as the first substrate. The substrate obtained such that a polyimide liquid crystal orienting film 7 to which a rubbing process is not performed is formed on the surface of a glass substrate 5 having an ITO electrode 6 is used as the second substrate. The first substrate is set to oppose the second substrate through spacers 8, and they are sealed to give a cell gap of about 10 µm. Thereafter, pentylcyanobiphenyl (5CB, available from BHD) in the form of liquid crystal molecules are injected into the cell, sealed, heated, and then gradually cooled to align a liquid crystal 9. A power supply 10 is connected to the ITO electrodes 2 and 6, so that a predetermined voltage is applied across these ITO electrodes.

Comparative Example 1

A liquid crystal cell is formed in the same manner as described in Example 1 except that each of the substrates used are formed without performing a rubbing process on the liquid crystal orienting film.

Comparative Example 2

A liquid crystal cell is formed in the same manner as described in Example 1 except that each of the substrates used are formed after performing a rubbing process on the liquid crystal orienting film.

In each of the above three types of liquid crystal cells (Example 1, Comparative Example 1, and Comparative Example 2), the response of liquid crystal molecules with respect to an application of a pulsed electric field is examined using a measuring apparatus shown in FIG. 2. In this experiment, infrared absorption of 2,225 cm$^{-1}$ attributed to the stretching vibration of the cyano group of 5CB is time-resolved and measured, thereby observing the motion of the liquid crystal molecules. Since the motion of the cyano groups corresponds to the motion of a liquid crystal director, the motion of the liquid crystal director that determines the optical response of the liquid crystal cell can be observed by observing the motion of the cyano groups.

Referring to FIG. 2, a pulse signal generated by a function generator 21 is amplified by a high-speed amplifier 22 and then applied to a liquid crystal cell 100. On the other hand, infrared rays from a light source 23 are radiated on the liquid crystal cell 100 through a polarizer 24. The infrared rays of 2,225 cm$^{-1}$ from the liquid crystal cell 100 are spectrally analyzed by a dispersive-type infrared spectrometer 25 and detected by a highly sensitive mercury-cadmium-tellurium (MET) infrared detector 26. A time resolution is 500 ns, and a detection sensitivity converted into a director angle is about 0.01 degree. In this case, when the alignment of the liquid crystal molecules changes by applying an electric field to the cell, an absorbance changes. This change is amplified by an AC amplifier 27, amplified by a main amplifier 28, and then input to a digital sampling oscilloscope 29 and, at the same time, integrated by a box-car integrator 30. The measuring system is entirely controlled by a computer 31.

FIG. 3 shows a change in infrared absorption with time where a pulsed electric field is applied to a liquid crystal cell under the conditions: a voltage of 10 V, a pulse width of 2 ms, and a frequency of 5 Hz (interval time: 198 ms). A time resolution is 10 μs. In this case, although the direction of the director of the liquid crystal molecules has a certain tilt angle with respect to the cell surface in an initial state, the direction is almost parallel to the cell surface. The direction is rotated with voltage application and becomes almost perpendicular to the cell surface. The direction of the cyano groups changes like the direction of the liquid crystal molecules, and the magnitude of infrared absorption decreases with voltage application. When the voltage is removed, the direction of the liquid crystal molecules is returned to the initial direction, and the magnitude of the infrared absorption is returned to the original magnitude.

As is apparent from FIG. 3, the change in infrared absorption when the electric field application is ended (2 ms after the field application) is largest in the liquid crystal cell of Example 1, and is 10 or more times that of the liquid crystal cell of Comparative Example 1 or 2. It is found that a response is considerably increased in the liquid crystal cell of Example 1. Therefore, it is expected that when driven at the same voltage, the liquid crystal cell of Example 1, in which a PBLG film is used as a liquid crystal orienting film, can obtain a contrast ratio higher than that of the liquid crystal cell of Comparative Example 1 or 2 in which a polyimide film is used as a liquid crystal orienting film. The liquid crystal cell of Example 1, however, can obtain the same contrast ratio as in Comparative Example 1 or 2 at a voltage lower than that applied to the liquid crystal cell of Comparative Example 1 or 2.

In each of the liquid crystal cells of Example 1 and Comparative Examples 1 and 2, the frequency of an applied voltage, i.e., an interval time, is changed to measure the time required for returning the state of the liquid crystal molecules to the initial state. When the frequency is high, after an electric field is removed, a next pulsed electric field is applied before the state of the liquid crystal molecules is completely returned to the initial state. For this reason, hysteresis of electric field application is left in the movement of the liquid crystal molecules. However, when the frequency is lower than a certain frequency, i.e., when the interval time is longer than a certain time, the next pulsed electric field is applied in a state wherein the liquid crystal molecules is completely returned to the initial state. For this reason, the motion of the liquid crystal molecules becomes constant. While the frequency of a pulsed electric field is varied, a time required for causing the liquid crystal molecules to rise (time at which 50% of the maximum change in infrared absorption achieved by pulsed electric field application is exhibited) is measured, and an interval time required for setting the value to be constant is examined. The results are shown in FIG. 4.

As is apparent from FIG. 4, although the liquid crystal cell of Example 1 is returned to the initial state within about 400 ms, that of comparative Example 2 requires a time of about 800 ms, and that of comparative Example 1 requires a time of 1,600 ms or more. As is apparent from these results, since the alignment of the PBLG film constituting the liquid crystal orienting film of the liquid crystal cell of Example 1 is rapidly restored to recover a strong orienting force acting on the liquid crystal molecules, the state of the liquid crystal molecules can be returned to the initial state within a time shorter than that of a liquid crystal orienting film consisting of a rubbed polyimide film. The time obtained from this experiment is longer than a rise time obtained by optical measurement. This means that a relatively long time is required for completely returning the state of not only the liquid crystal molecules of a bulk but also the liquid crystal molecules near the liquid crystal orienting film to the initial state.

In order to realize a higher response, a method of applying an electric field is examined. In this case, the same experiment as described above is performed to the liquid crystal cell of Example 1 using two methods, i.e., a method (A) in which a voltage of 10 V is continuously applied for me and a method (B) in which, after an initial voltage of 15 V is applied for 0.5 ms, a voltage of 10 V is applied for 0.5 ms. Results obtained by these experiments are shown in FIG. S.

Figure 5:
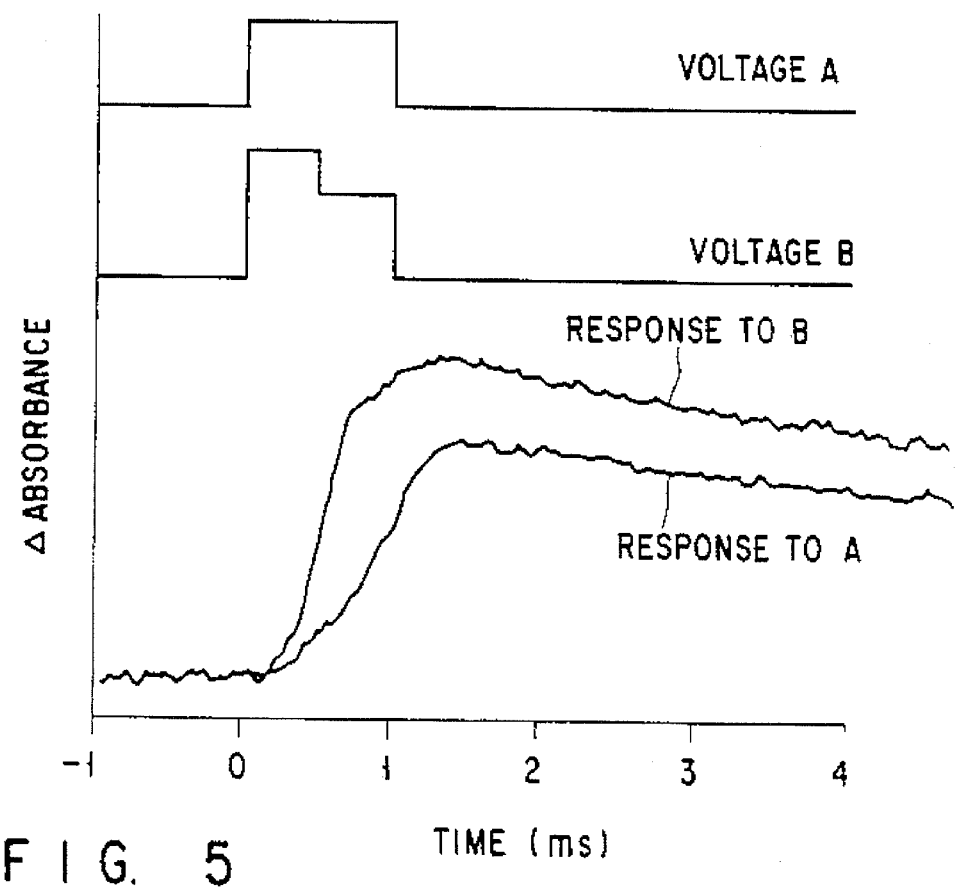
FIG. 5 is a graph showing the response curves of the liquid crystal cell according to the present invention with respect to the application and stop of a voltage when a method of applying the voltage is changed.

As is apparent from FIG. 5, after a voltage is applied, the time required for causing a change to reach 50% of the maximum change is about 0.6 ms in method A and about 0.3 ms in method B. The value obtained in method B is about half of that obtained in method A. In the liquid crystal cell of Example 1, it is confirmed that the liquid crystal molecules can be caused to rise at a high speed by applying an initial voltage higher than an effective driving voltage to the liquid crystal cell before the effective driving voltage is applied.

Example 2

Example 2a

Figure 6:
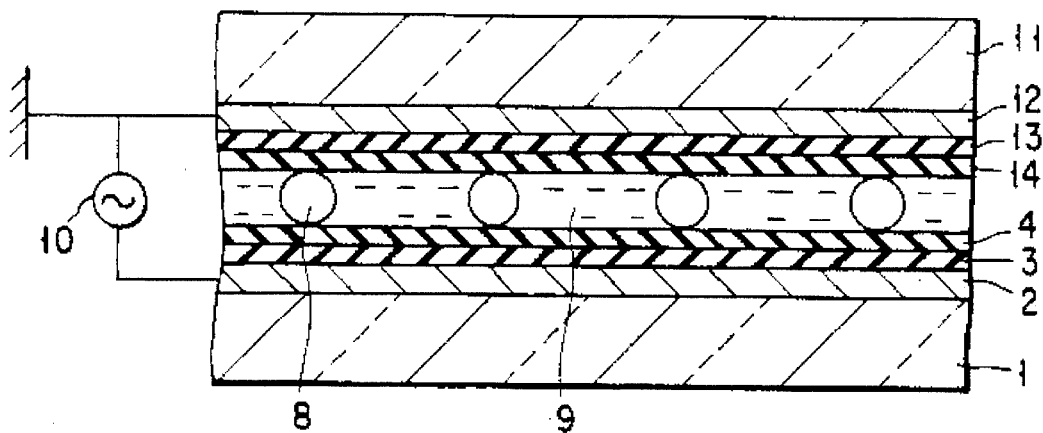
FIG. 6 is a sectional view showing a liquid crystal cell formed according to Example 2 of the present invention.

A liquid crystal cell according to this example shown in FIG. 6 is formed as follows. A first glass substrate 1 (20 mm×5 mm) having an ITO film 2 formed on a surface thereof is washed with flowing distilled water for an hour, washed with methylene chloride by ultrasonic cleaning for 5 minutes, and then washed with a flon vapor. 1.25 g of N-(2-aminoethyl)-3-aminopropylmethyldimethoxy-silane (silane coupling agent available from Toshiba Silicone, tradename: TSL-8345) serving as a surface treating agent are mixed with 25 cc of distilled B water and 1 cc or an acetic acid. This mixture is stirred, thereby preparing a solution of pH 4 for surface treatment. The first glass substrate 1 is dipped into this solution, and kept in the solution at room temperature for 8 hours. The first glass substrate 1 is washed with methylene chloride, distilled water, and acetone in this order and then dried. As a result, a layer of the surface treating agent 3 terminated with amino groups is formed on the substrate surface.

A second glass substrate 11 (20 mm×5 mm) having an ITO film 12 formed on a surface thereof is washed with flowing distilled water for an hour, washed with methylene chloride by ultrasonic cleaning for 5 minutes, and then washed with a flon vapor. 1.25 g of a silane coupling agent having isocyanate groups (available from Chisso) serving as a surface treating agent are mixed with 25 cc of distilled water and 1 cc of an acetic acid. This mixture is stirred, thereby preparing a solution of pH 4 for surface treatment. The second glass substrate 11 is dipped into this solution, and kept in the solution at room temperature for 8 hours. The second glass substrate 11 is washed with methylene chloride, distilled water, and acetone in this order and then dried. As a result, a layer of surface treating agent 13 terminated with isocyanate groups is formed on the substrate surface.

Subsequently, 3 g of poly(γ-benzyl-L-glutamate (PBLG, available from Sigma, molecular weight: 116,000) are dissolved in 50 cc of dry methylene chloride. 1.4 g of DCC (dicyclohexylcarbodiimide) are then added and the mixture is reacted at 0° C. for 20 minutes. The first and second glass substrates 1 and 11 are dipped into this solution, and the temperature of the solution is slowly raised to room temperature. In this state, the first and second glass substrates 1 and 11 are reacted with the solution overnight. Upon completion of the reaction, the first and second glass substrates 1 and 11 are washed with methylene chloride, acetone, distilled water, and acetone in this order to remove by-products and excessive PBLG from the first and second 9lass substrates 1 and 11. The result is the formation of liquid crystal orienting films 4 and 14 each constituted by a PBLG monolayer film on the layers of surface treating agents 3 and 13, respectively.

In the first glass substrate 1, the PBLG monolayer film is bound to the substrate 1 such that a carboxyl group at one end of each PBLG molecule reacts with one of the amino groups on the substrate surface side, and amino groups are present on the film surface side. Therefore, the dipole moment of S this PBLG monolayer film is directed from the substrate side to the film surface side. On the other hand, in the second glass substrate 11, the PBLG monolayer film is bound to the substrate such that an amino group at one end of each PBLG molecule reacts with one of the isocyanate groups on the surface of the substrate, and carboxyl groups are present on the film surface side. Therefore, the dipole moment of this PBLG monolayer film is directed from the film surface side to the substrate side.

The thickness of each of the PBLG monolayer films formed as described above is estimated to be about 75 nm, assuming that all the molecules of the film are aligned perpendicularly to the substrate surface. The contact angle of water measured before the formation of the PBLG monolayer film is 22°; the angle measured after the formation of the PBLG monolayer film is 51°. For this reason, it is found that the PBLG monolayer film is hydrophobic due to the PBLG skeleton. In addition, when an atomic ratio on the surface of the PBLG monolayer film is measured by an XPS method, the ratio of carbon to nitrogen is about 12:1. This ratio coincides with that of the composition of PBLG.

Figure 7:
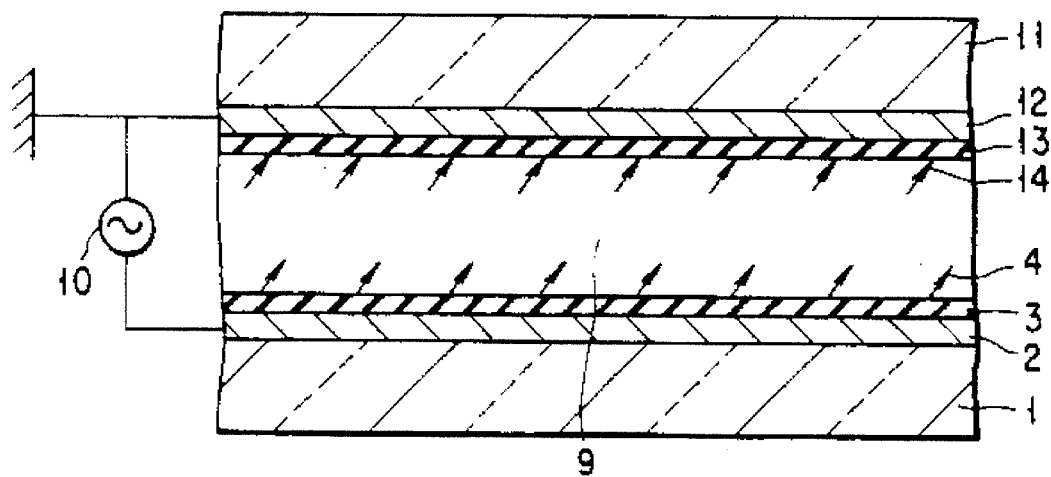
FIG. 7 is a view showing the directions of the dipole moments of the liquid crystal orienting films of the liquid crystal cell in FIG. 6.

As shown in FIG. 6, the first and second glass substrates 1 and 11 are set to oppose each other through spacers 8 and sealed to give a cell gap of about 10 pm. Thereafter, pentylcyanobiphenyl (5CB, available from BHD) in the form of liquid crystal molecules are injected into the cell, sealed, heated, and then gradually cooled to align a liquid crystal 9. FIG. 7 diagrams the directions of the dipole moments of the PBLG films. The dipole moments of the PBLG films constituting the liquid crystal orienting films 4 and 14 respectively formed on the two glass substrates 1 and 11 through the layers of the surface treating agents 3 and 13 have the components of the same direction when viewed in the direction perpendicular to the substrates.

Example 2b

Liquid crystal orienting films are formed on the first and second glass substrates in the same manner as described above except that PBLG and poly(γ-benzyl-L-glutamate) (PBDG, available from Sigma, molecular weight: 298,000) mixed with each other at a molar ratio of 1:1 as repeating units are used in place of poly(γ-benzyl-L-glutamate) (psLGt available from Sigma, molecular weight: 116,000). Note that PBDG, like PBLG, has a dipole moment of 1,000 debye or more. A liquid crystal cell similar to that shown in FIG. 6 is formed using these glass substrates.

Example 2c

A rubbing process is performed to liquid crystal orienting films on the surfaces of first and second glass substrates formed as in Example 2a. A liquid crystal cell as in FIG. 6 is formed using these glass substrates.

Example 2d

A rubbing process is performed to liquid crystal orienting films on the surfaces of first and second glass substrates formed as in Example 2b. A liquid crystal cell as in FIG. 6 is formed using these glass substrates.

In each of the liquid crystal cells of Examples 2a to 2d, since the liquid crystal orienting films respectively formed on the surfaces of the two substrates are moved in the same direction by applying a voltage, the voltage applied can be reduced. In each of the liquid crystal cells, a threshold voltage obtained by the time-resolving measurement described above is 2.2 V. In addition, a constant driving voltage is applied to each of the liquid crystal cells at a frequency of 30 Hz (application time per pulse is 33 ms) to examine its transmittance, and the relationship between the voltage and the transmittance is examined. As a result, it is found that each of the liquid crystal cells can perform a display operation at ±3 v. This voltage is hereinafter referred to as a regular driving voltage hereinafter.

Note that the liquid crystal cells of Comparative Examples 1 and 2 each having the above polyimide liquid crystal orienting film compared with the liquid crystal cells of Examples 2a to 2d.

In each of the liquid crystal cells of Comparative Examples 1 and 2, a dichroic ratio of long axis direction to short axis direction (when no electric field is applied) is calculated by the stretching vibration of a cyano group of 2,225 $cm^{-1}$ obtained by infrared absorption spectroscopy. Response times to an electric field (rise time $\tau_r$ and decay time $\tau_d$) are measured when each of the liquid crystal cells of Examples 2a to 2d is driven such that a rectangular voltage of ±3 v (regular driving voltage) having a ratio of 1:1 is applied to the liquid crystal cell at a frequency of 30 Hz (pulse width: 33 ms). The rise time $\tau_r$ is the time required for decreasing a brightness to 10% after the voltage is turned on, and the decay time $\tau_d$ is the time required for recovering a brightness to 90% after the voltage is turned off. Each of the liquid crystal cells of Comparative Examples 1 and 2 is driven at a voltage of ±7 V, thereby performing the same experiment as described above. In addition, a physical contrast ratio $CR=I^{OFF}:I^{ON}$ is measured using an He-Ne laser as a light source. The results obtained by these measurements are described in Table 1.

TABLE 1

|  | Dichroic Ratio | $\tau_r$ (ms) | $\tau_d$ (ms) | CR |
|---|---|---|---|---|
| Comparative Example 1 | 1 | 8 | 100 | 5:1 |
| Comparative Example 2 | 3 | 10 | 20 | 150:1 |
| Example 2a | 1.2 | 8 | 20 | 75:1 |
| Example 2b | 1.4 | 8 | 19 | 120:1 |
| Example 2c | 2.5 | 6.5 | 16 | 170:1 |
| Example 2d | 3 | 5 | 15 | 200:1 |

As is apparent from Table 1, each of the liquid crystal cells of Examples 2a to 2d has a short rise time $\tau_r$, a short decay time $\tau_d$, and a high physical contrast ratio CR.

Example 3

A liquid crystal cell as in Example 2d and shown in FIG. 6 is formed as follows. A first glass substrate (20 mm×5 mm) 1 having an ITO electrode 2 formed on a surface thereof is prepared, washed with flowing distilled water for an hour, washed with methylene chloride by ultrasonic cleaning for 5 minutes, and then washed with a flon vapor. 1.25 g of N-(2-aminoethyl)-3-aminopropylmethyldimethoxy-silane (silane coupling agent available from Toshiba silicone, tradename: TSL-8345) serving as a surface treating agent are mixed with 25 cc of distilled water and 1 cc of an acetic acid. This mixture is stirred, thereby preparing a solution of Ph 4 for surface treatment. The first glass substrate 1 is dipped into this solution, and kept in the solution at room temperature for 8 hours. The first glass substrate 1 is washed with methylene chloride, distilled water, and acetone in this order and then dried. As a result, a layer of the surface treating agent 3 terminated with amino groups is formed on the substrate surface.

A second glass substrate 11 (20 mm×5 mm) having an ITO film 12 formed on a surface thereof is washed with flowing distilled water for an hour, washed with methylene chloride by ultrasonic cleaning for 5 minutes, and then washed with a flon vapor. 1.25 g of a silane coupling agent having isocyanate groups (available from Chisso) serving as a surface treating agent are mixed with 25 cc of distilled water and 1 cc of an acetic acid. This mixture is stirred, thereby preparing a solution of pH 4 for surface treatment. The second glass substrate 11 is dipped into this solution, and kept in the solution at room temperature for 8 hours. The second glass substrate 11 is washed with methylene chloride, distilled water, and acetone in this order and then dried. As a result, a layer of surface treating agent 13 terminated with isocyanate groups is formed on the substrate surface.

Subsequently, as in Example 2, 3 g of a mixture obtained by mixing poly(γ-benzyl-L-glutamate) (PBLG, available from Sigma, molecular weight: 116,000) and poly(γ-benzyl-D-glutamate) (PBDG, available from Sigma, molecular weight: 298,000) with each other at a ratio of 1:1 are dissolved in 50 cc of dry methylene chloride. 1.4 g of DCC (dicyclohexylcarbodiimide) are then added to the mixture and reacted at 0° C. for 20 minutes. The first and second glass substrates 1 and 11 are dipped into this solution, and the temperature of the solution is slowly raised to room temperature. In this state, the first and second glass substrates 1 and 11 are reacted with the solution overnight. Upon completion of the reaction, the first and second glass substrates 1 and 11 are washed with methylene chloride, acetone, distilled water, and acetone in this order to remove by-products and excessive PBLG and PBDG from the first and second glass substrates 1 and 11. This results in the formation of liquid Crystal orienting films 4 and 14 constituted by monolayer films containing PBLG and PBDG on the layers of surface treating agents 3 and 13, respectively. A rubbing process is performed to the liquid crystal orienting films 4 and 14. Thereafter, a liquid crystal cell having a structure shown in FIG. 6 is formed.

In a liquid crystal cell according to the present invention, as described in relation to FIG. 5, it is expected that a voltage response can be increased by designing a method of removing a liquid crystal orienting force generated by a liquid crystal orienting film. Therefore, the dynamic characteristics of the liquid crystal cell of this example are measured using the same measuring apparatus as shown in FIG. 2, and conditions for a driving method are examined in detail.

The threshold voltage of this liquid crystal cell is 2.2 V as described above. When a voltage of 2.4 V is applied to the liquid crystal cell, the liquid crystal molecules begin to move about 1 ms after the voltage application.

As in the experiment shown in FIG. 5, it is expected that a liquid crystal orienting force generated by the liquid crystal orienting film can be quickly lost by applying a high initial voltage to the liquid crystal cell first, and the following experiment is performed.

FIG. 8 shows results obtained when a voltage of 2.2 V equal to a threshold voltage is applied to the liquid crystal cell after a voltage of 4.4 V (twice the threshold voltage) is applied. The total time for applying the voltage is set to 2 ms within a range in which liquid crystal molecules can be satisfactorily observed. This unit time of 2 ms is divided into 32. The application time of the initial voltage of 4.4 V is changed in an integer multiple of 2 ms×1/32. Referring to FIG. 8, the conditions for the application time of the initial voltage of 4.4 v are simply expressed by x/32 (X:0 to 32).

As is apparent from FIG. 8, although the liquid crystal does not move at all when the voltage of 4.4 V is not applied to the liquid crystal cell, the liquid crystal moves slightly when the voltage of 4.4 v is applied for 2 ms×1/32 (62.5 µs), and the liquid crystal moves markedly when the voltage is applied for 2 ms×8/32 (0.5 ms) or more.

Figure 9:
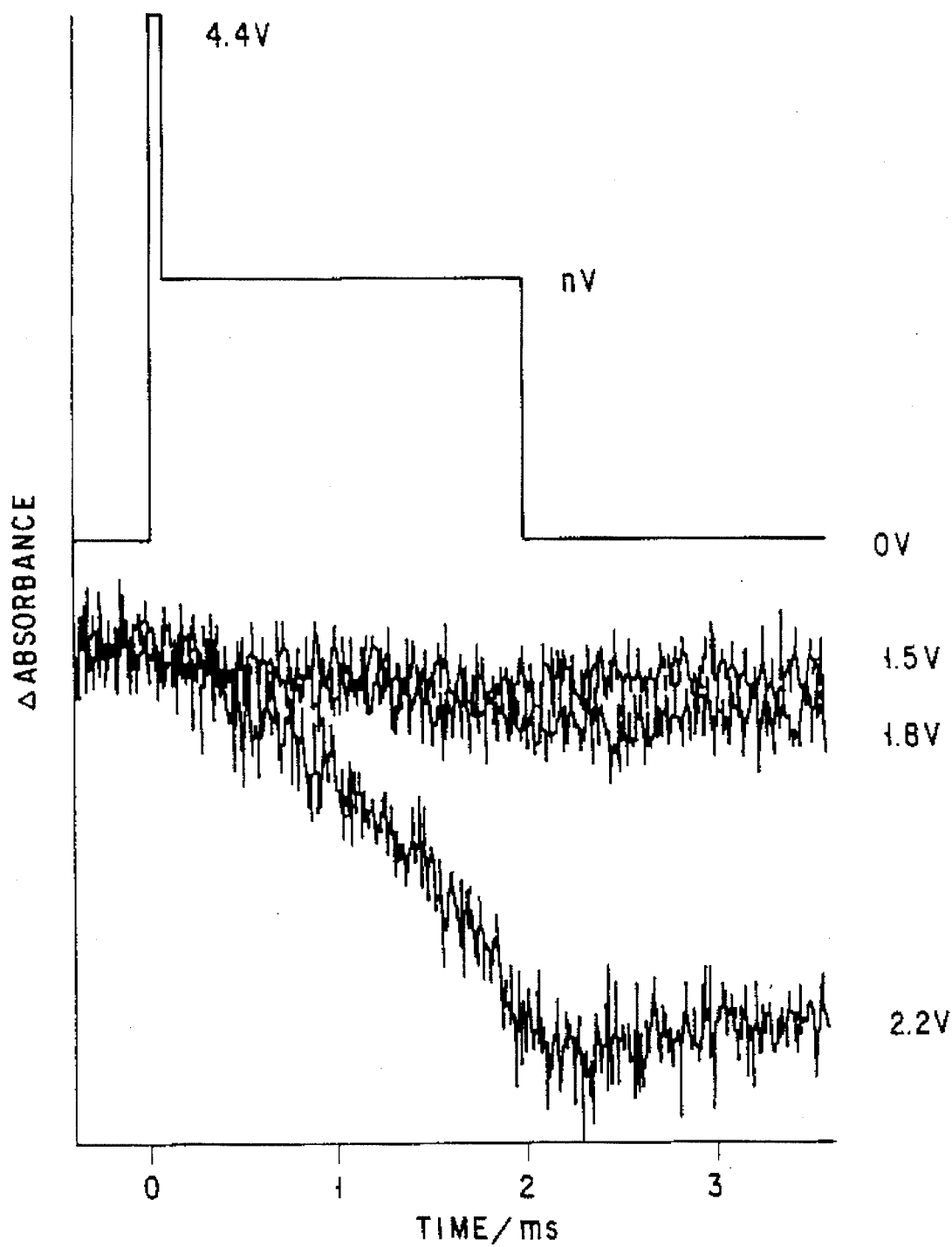
FIG. 9 is a graph showing an effect of decreasing a positive voltage in the liquid crystal cell according to Example 3 of the present invention.

In addition, it is expected that, When a high initial voltage is applied first, a voltage applied subsequent to the initial voltage may be decreased to a lower voltage than the threshold voltage, so that the following experiment is performed. FIG. 9 shows results obtained when a voltage of n v (2.2 V, 1.8 V, or 1.5 V) was applied for a time of 2 ms×31/32 after an initial voltage of 4.4 V was applied for 2 ms×1/32 (62.5 µs). As is apparent from FIG. 9, if the initial voltage of 4.4 v is applied to the liquid crystal cell first, even when an effective driving voltage subsequently applied to the initial voltage is decreased to 1.8 V (80% of the threshold voltage), the liquid crystal can still move.

Figure 10:
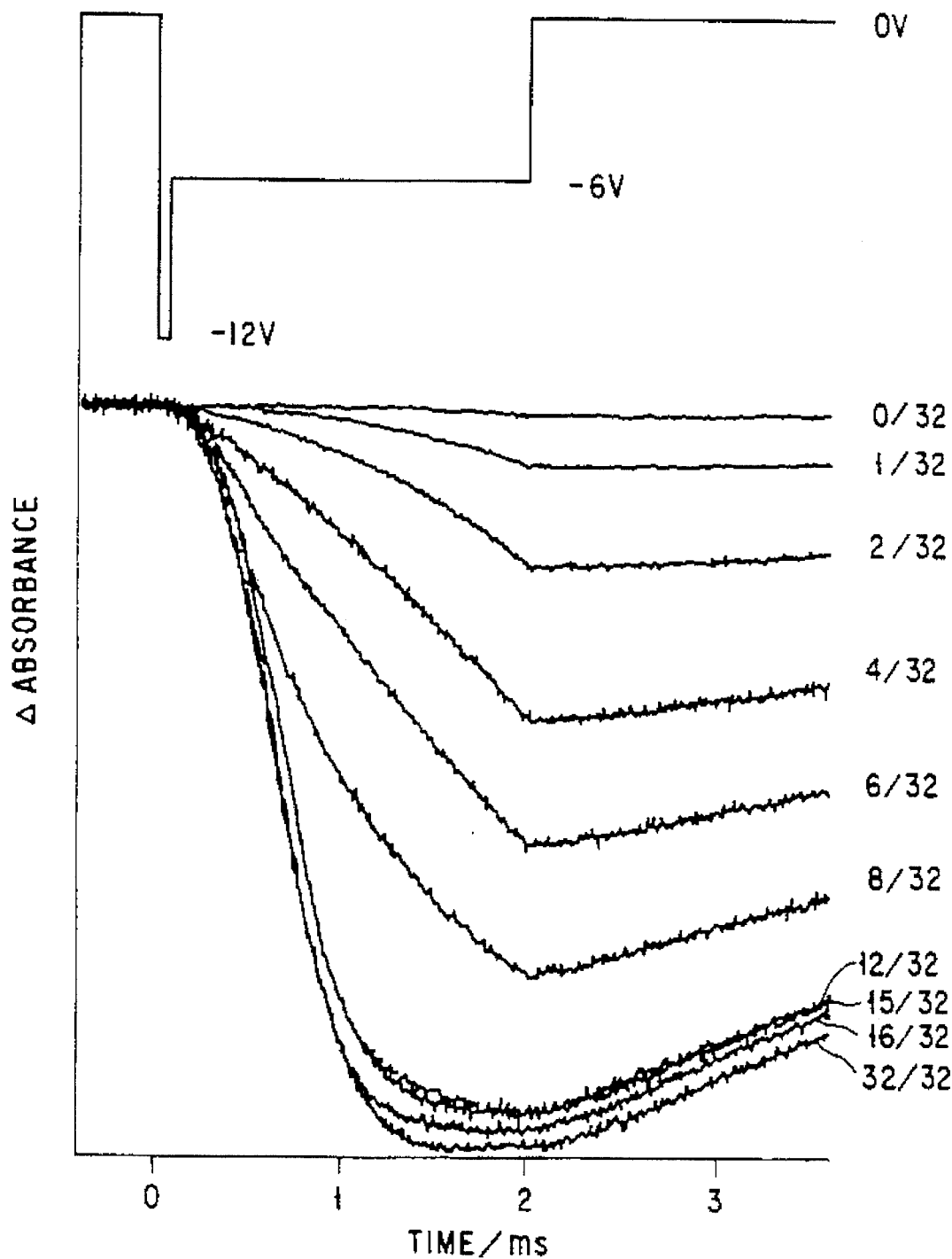
FIG. 10 is a graph showing the response curves of the liquid crystal cell according to Example 3 of the present invention when a method of applying a negative voltage is changed.
Figure 11:
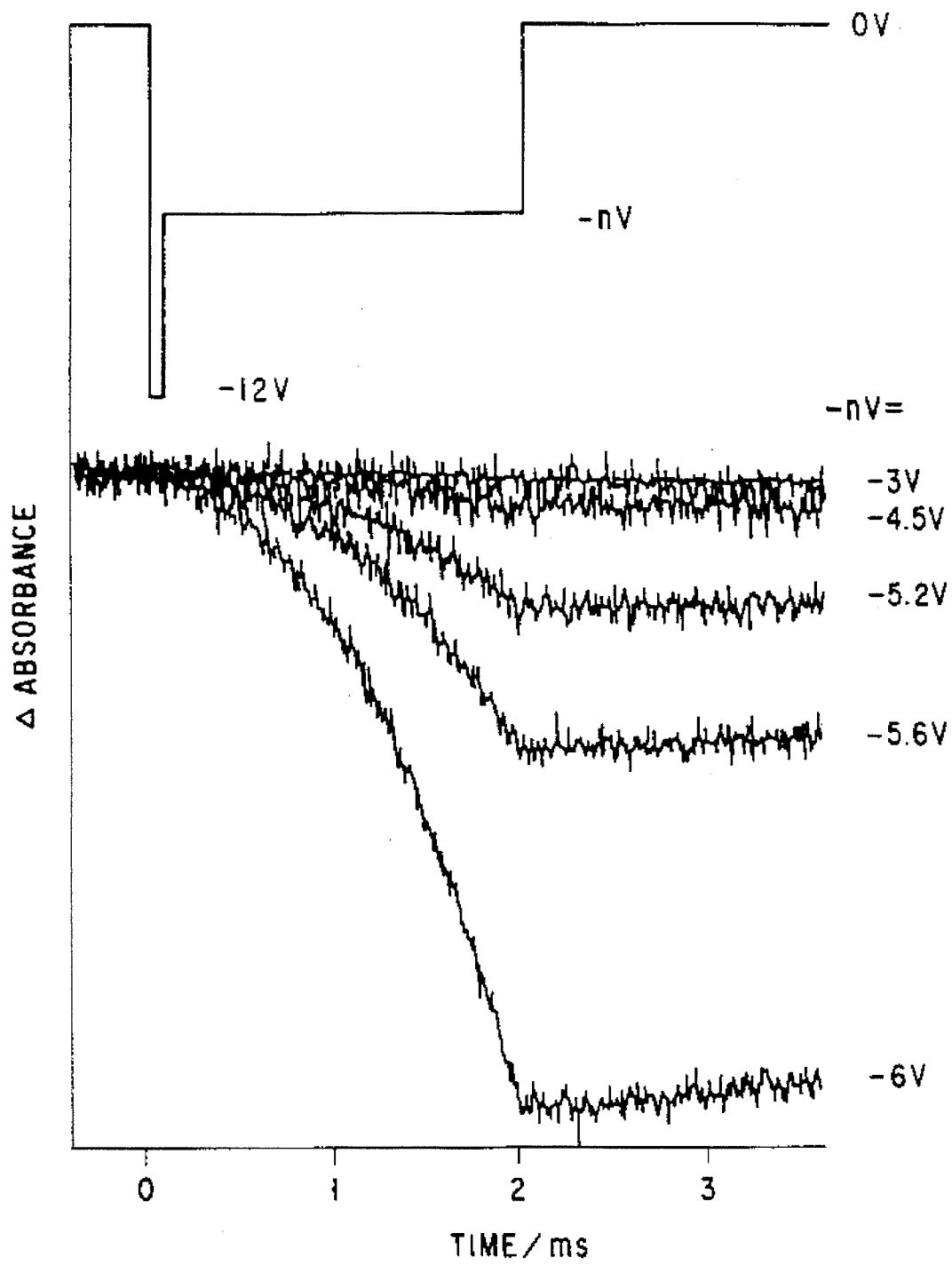
FIG. 11 is a graph showing an effect of decreasing a negative voltage in the liquid crystal cell according to Example 3 of the present invention.

FIGS. 10 and 11 show the results corresponding to FIGS. 8 and 9 where a negative voltage was applied to the first substrate of the liquid crystal cell of this example.

In this case, the threshold voltage obtained when a negative voltage was applied to the first substrate was −6 V. The absolute value of the threshold voltage obtained when the negative voltage was applied to the first substrate as described above was greater than that obtained when a positive voltage was applied the first substrate. This is because when PBLG and PBDG constitute the liquid crystal orienting film of the first substrate, carboxyl groups are bound to the substrate, amino groups are present on the film surface side, and a dipole moment is directed from the substrate side to the film surface side. When PBLG and PBDG constitute the liquid crystal orienting film of the second substrate, amino groups are bound to the substrate, carboxyl groups are present at the ends on the film surface side, and a dipole moment is directed from the film surface side to the substrate side.

When a voltage was applied to the liquid crystal cell such that the first and second substrates respectively were positive and negative, the polyamino acid was rotated in a direction perpendicular to the substrates. This is because a repulsive force acts on the dipole moment of the liquid crystal orienting film of each of the first and second substrates. However, when a voltage was applied to the liquid crystal cell such that the first and second substrates respectively were negative and positive, the polyamino acid was rotated in a direction parallel to the substrates. This is because an attractive force acts on the dipole moment of the liquid crystal orienting film of each of the first and second substrates. In this case, since the energy of the former is lower than that of the latter, the absolute value of the threshold voltage obtained when a voltage is applied to the liquid crystal cell to make the first substrate positive decreases.

As is apparent from FIG. 10, When a pulse voltage of −12 V (twice the threshold voltage) was applied to the liquid crystal cell for a time of 2 ms×1/32 (62.5 µs), the liquid crystal was able to move. As is apparent from FIG. 11, when an initial voltage of −12 v was applied to the liquid crystal cell for 2 ms×1/32 (62.5 µs), even when a voltage subsequently applied to the initial voltage was decreased to −4.5 V (75% of the threshold voltage of −6 V), the liquid crystal was still able to move.

On the other hand, in Comparative Example 1 or 2, where a polyimide film was used as a liquid crystal orienting film, even when a high initial voltage was applied first, when a voltage subsequently applied to the initial voltage was decreased to a lower voltage than the threshold voltage, the movement of the liquid crystal cannot be recognized. For this reason, the voltage cannot be decreased.

As described above, if a liquid crystal orienting film used in the liquid crystal cell of the present invention loses an orienting force acting on a liquid crystal, the orienting force rarely acts on the liquid crystal molecules of a bulk apart from the liquid crystal orienting film. For this reason, the voltage response of the liquid crystal observed in an extremely short time period from the start of the above voltage application is expected to be applied to a voltage range in which a display operation can be performed. A resulting high response of display operation and decrease in effective driving voltage can be expected. A driving method used when a display operation was performed using the liquid crystal cell of this example is now examined.

An experiment was performed in which, after an initial voltage higher than a regular driving voltage (3 V) was applied to the liquid crystal cell for a period of time a half the unit time of 2 ms, an effective driving voltage (2.4 V) was 0.8 times the regular driving voltage applied for the remaining period of time. In this case, a voltage of 0.8 times the regular driving voltage was used because the minimum voltage required for moving liquid crystal molecules is set to 80% or more of the threshold voltage in the above experiment (where the liquid crystal is moved for the extremely short time from the start of voltage application). The initial voltage first applied was gradually decreased from a voltage of twice the regular driving voltage. It was then determined how many times the minimum initial voltage at which a display operation can be performed corresponds to the regular driving voltage. It was found that the minimum initial voltage was 3.5 V (1.16 times the regular driving voltage).

After an initial voltage (6 V) of twice the regular driving voltage was applied to the liquid crystal cell for a predetermined period of time, an effective driving voltage (2.4 V) of 0.8 times the regular driving voltage was applied for the remaining period of time. The application time of the initial voltage was gradually decreased from one half the unit time of 2 ms, and the shortest application time of the initial voltage for lo performing a display operation was examined. In this case, if the application time of the initial voltage is decreased by about 1/10 or less of the unit time, power consumption is lower than when only a constant regular driving voltage is applied. It was found that the application time of the initial voltage is suitably set to 1/50 the unit time of 2 ms.

To summarize, after an initial voltage (in this case, 6 V) of twice the regular driving voltage is applied to the liquid crystal cell for 1/50 the unit time of 2 ms, i.e., about 40 µs, and then an effective driving voltage of 0.8 times the regular driving voltage is applied, a display operation can be satisfactorily performed. Power consumption can be reduced by about 17.5% with respect to that used when only a constant voltage is applied for 2 ms.

The same experiment described above was performed to the same liquid crystal cell described in Example 2b. Here, non-rubbed films of PBLG and PBDG were used as the liquid crystal orienting films of the first and second substrates.

An experiment was performed in which, after an initial voltage higher than the regular driving voltage (3 V) was applied to the liquid crystal cell for one half the unit time of 2 ms, an effective driving voltage (2.4 V) of 0.8 times the regular driving voltage was applied for the remaining period of time. The initial voltage first applied was gradually decreased from a voltage of twice the regular driving voltage. It was examined how many times the minimum initial voltage at which a display operation can be performed corresponds to the regular driving voltage. It was found that the minimum initial voltage was 4 V (1.33 times the regular driving voltage).

After an initial voltage (6 V) of twice the regular driving voltage was applied to the liquid crystal cell for a predetermined period of time, an effective driving voltage (2.4 V) of 0.8 times the regular driving voltage was applied for the remaining period of time. The application time of the initial voltage was gradually decreased from one half the unit time of 2 ms. The shortest application time of the initial voltage for performing a display operation was then examined. It was found that the application time of the initial voltage can suitably be set to 1/50 the unit time of 2 ms.

To summarize, after an initial voltage (6 V) of twice the regular driving voltage is applied to the liquid crystal cell for 1/50 the unit time of 2 ms, i.e., about 40 µs, and then an effective driving voltage of 0.8 times the regular driving voltage is applied, a display operation can be satisfactorily performed. Power consumption can be reduced by about 17.5% with respect to that used when only a constant voltage is applied for 2 ms.

Figure 12:
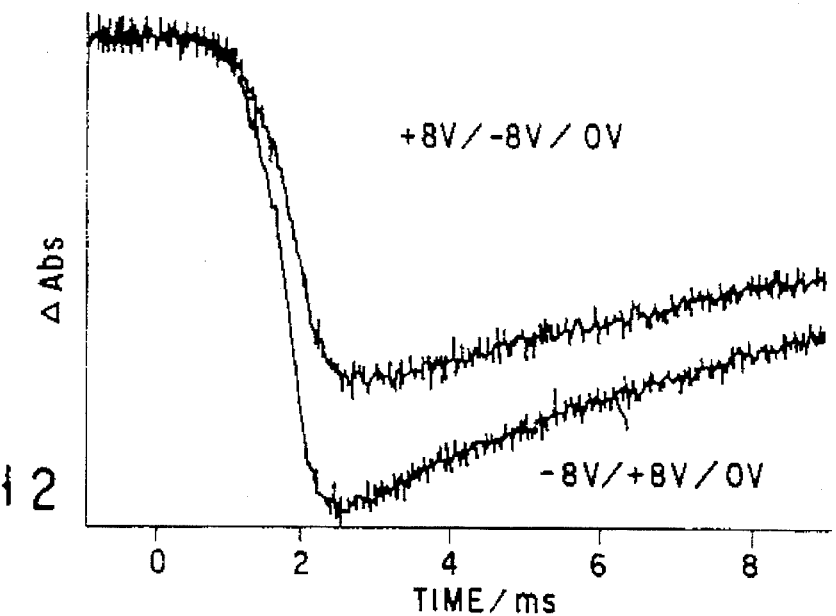
FIG. 12 is a graph showing an influence of the sign of a voltage applied first in application of an AC voltage on the response of the liquid crystal cell according to Example 3 of the present invention.

AC voltages were applied to the liquid crystal cell of Example 3 for 2 ms to examine the influence of the sign of the first pulse of the AC voltage used. The results are shown in FIG. 12 The pulse width was set to be 2 ms×1/32 (62.5 μs). An AC voltage was applied to the liquid crystal cell as is apparent from FIG. 12, when the first pulse applied to a substrate on which a polymer film having a dipole moment directed from the film surface side to the substrate is formed has a positive voltage, and the first pulse applied to a substrate on which a polymer film having a dipole moment directed from the substrate side to the film surface is formed has a negative voltage, the voltage response in liquid crystal driving can be increased.

The preferable voltage polarity of the first pulse used when such an AC voltage is applied is opposite to the preferable voltage polarity used when the initial voltage and effective driving voltage have the waveforms shown in FIGS. 8 and 9.

Figure 13:
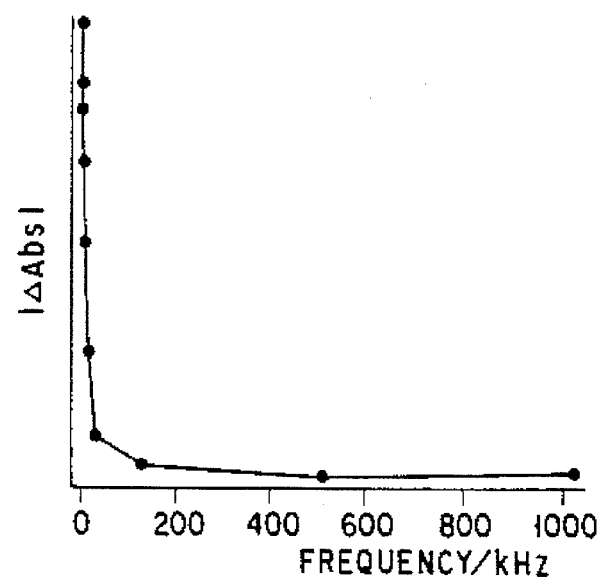
FIG. 13 is a graph showing the driving frequency characteristics of a response for a conventional liquid crystal cell having polyimide liquid crystal orienting film.
Figure 14:
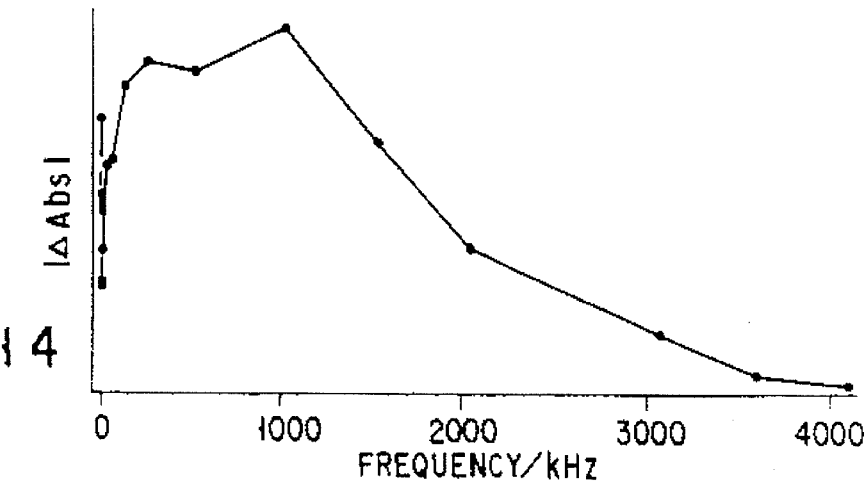
FIG. 14 is a graph showing the driving frequency characteristics of a response for a liquid crystal cell having liquid crystal orienting films consisting of PBLG and PBDG according to the present invention.

FIGS. 13 and 14 show results obtained by examining the frequency of a driving voltage for a liquid crystal cell in which each liquid crystal orienting film consists of polyimide (FIG. 13) or PBLG and PBDG (FIG. 14). The abscissa indicates frequency, and the ordinate indicates the magnitude of infrared absorption corresponding to the movement of a liquid crystal. As shown in FIG. 13, when the liquid crystal orienting film consists of polyimide, the liquid crystal rarely moves at a frequency of about 30 kHz. On the other hand, as shown in FIG. 14, when the liquid crystal orienting films consist of PBLG and PBDG, after the movement of the liquid crystal initially decreases, the movement of the liquid crystal recovers, and the movement of the liquid crystal can be observed at a frequency of 1 MHz or more. These results demonstrate that the liquid crystal cell of the present invention can be driven in a high-frequency region.

Additional advantages and modifications of this invention will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A liquid crystal device comprising:
   two substrates, each substrate having an inner and an outer surface, the substrates positioned opposite and substantially parallel to one another such that the inner surfaces are in closer proximity than the outer surfaces;
   a surface treating agent layer, the layer formed by chemically treating the inner surface of each respective substrate;
   a liquid crystal orienting film bound to the inner surface of each substrate through the surface treating agent layer, the liquid crystal orienting film of at least one of the two substrates constituted by a polymer, the polymer having a dipole moment of not less than 20 debye; and
   a liquid crystal sealed between the substrates, such that when a voltage is applied to the liquid crystal orienting film, alignment of molecules in the liquid crystal orienting film is disturbed.

2. The device according to claim 1, wherein the polymer has a dipole moment of not less than 350 debye.

3. The device according to claim 1, wherein the polymer consists essentially of a polyamino acid.

4. The device according to claim 3, wherein the polyamino acid has a molecular weight of not less than 20,000.

5. The device according to claim 3, wherein the polyamino acid consists of a mixture of an L-form and a D-form.

6. The device according to claim 5, wherein a ratio of the L-form to the D-form falls within a range of 1:3 to 3:1 as a molar ratio of repeating units.

7. A liquid crystal device comprising:
   two substrates, each substrate having an inner and an outer surface, the substrates positioned opposite and substantially parallel to one another such that the inner surfaces are in closer proximity than the outer surfaces;
   a surface treating agent layer, the layer formed by chemically treating the inner surface of each respective substrate;
   a liquid crystal orienting film bound to the inner surface of each substrate through the surface treating agent layer, the liquid crystal orienting film of at least one of the two substrates constituted by a polymer, the polymer having a dipole moment of not less than 20 debye, the liquid crystal orienting films formed on the two substrates each having a dipole moment that is oriented in the same direction with respect to the direction perpendicular to the substrates; and
   a liquid crystal sealed between the substrates, such that when a voltage is applied to the liquid crystal orienting film, alignment of molecules in the liquid crystal orienting film is disturbed.

8. The device according to claim 7, wherein the liquid crystal orienting films are uniaxially aligned.

* * * * *

UNITED STATES PATENT AND TRADEMARK OFFICE
CERTIFICATE OF CORRECTION

PATENT NO.   : 5,543,949

DATED        : August 6, 1996

INVENTOR(S)  : MACHIDA et al

It is certified that error appears in the above-identified patent and that said Letters Patent is hereby corrected as shown below:

On the title page, item [22] should read as follows:

[22]  Filed:  August 17, 1994

Signed and Sealed this

Twenty-second Day of October, 1996

Attest:

BRUCE LEHMAN

*Attesting Officer*               *Commissioner of Patents and Trademarks*